Oct. 29, 1946.   G. H. BLEEKE   2,410,147
APPARATUS FOR GRADING FRUITS, VEGETABLES,
AND OTHER PRODUCTS ACCORDING TO SIZE
Filed Aug. 12, 1943   2 Sheets-Sheet 1
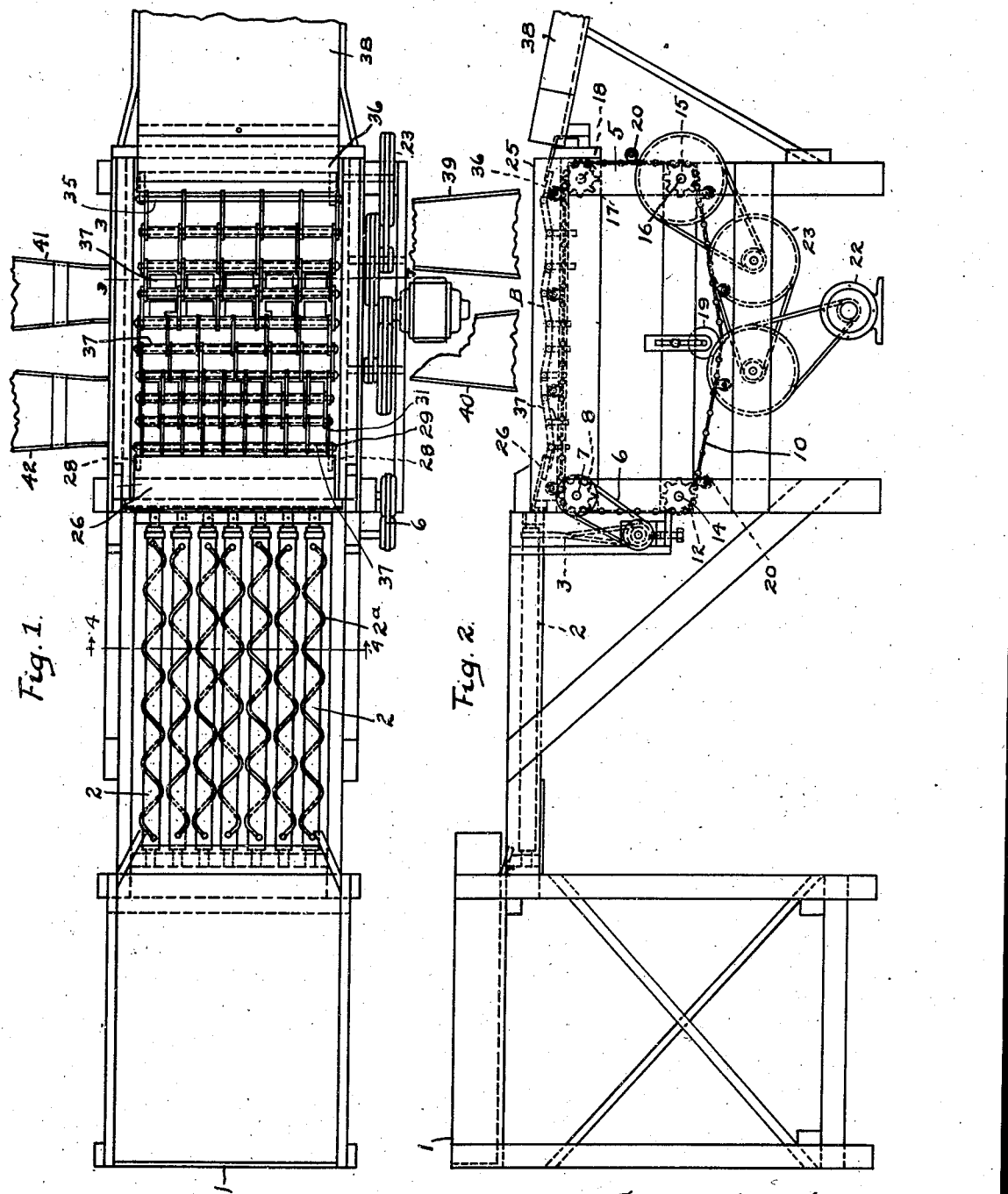
Gustave H. Bleeke
INVENTOR
BY
ATTORNEY

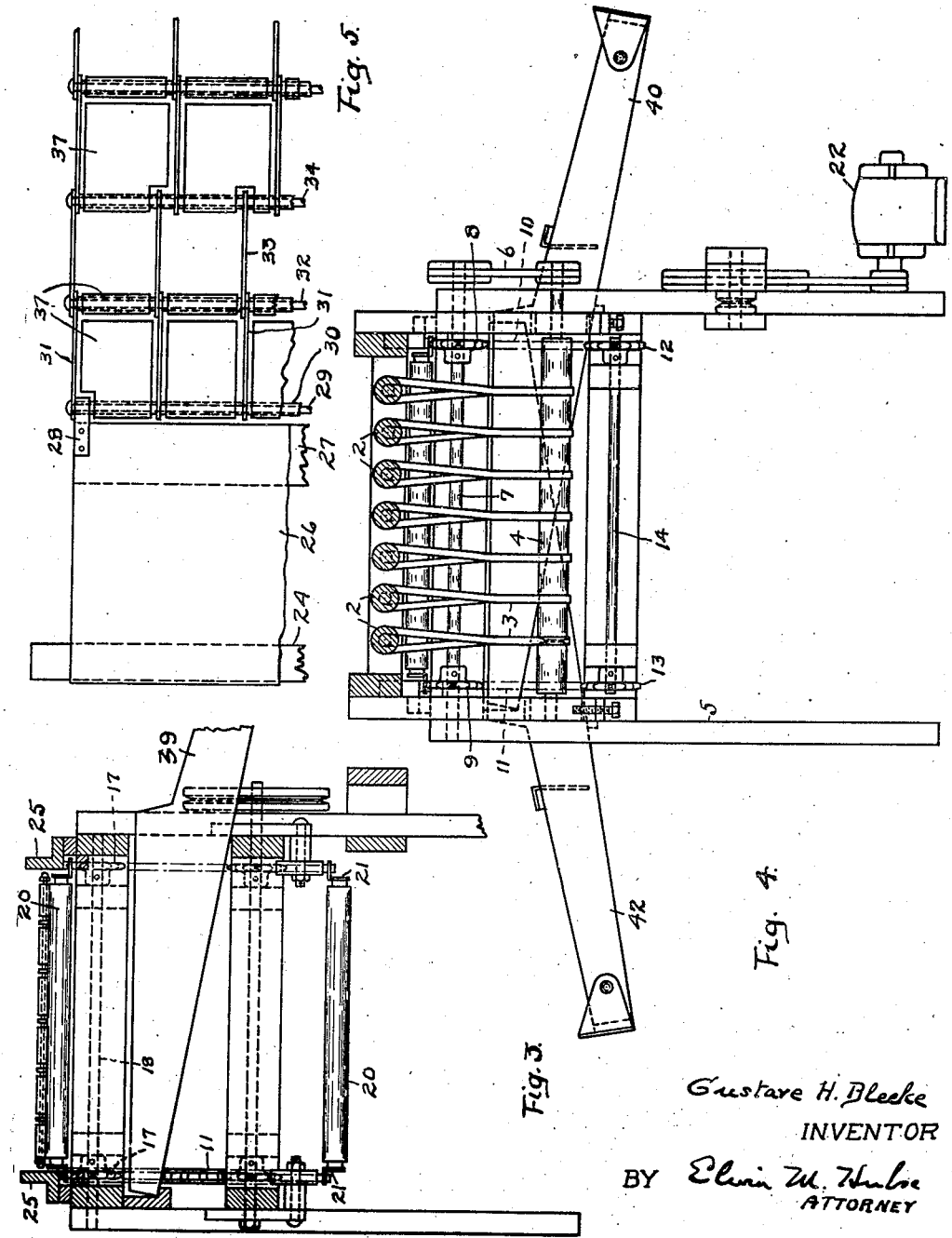

Patented Oct. 29, 1946

2,410,147

UNITED STATES PATENT OFFICE 2,410,147

APPARATUS FOR GRADING FRUITS, VEGETABLES, AND OTHER PRODUCTS ACCORDING TO SIZE

Gustave H. Bleeke, Fort Wayne, Ind.

Application August 12, 1943, Serial No. 498,287

5 Claims. (Cl. 209—85)

The invention relates to machines for grading fruits, vegetables and other products according to their size.

The object of the invention is to provide a simple machine by which products, such as apples, oranges and various other foods in similar form as well as other products may be rapidly and efficiently graded according to size.

The invention consists in the novel arrangement and combination of parts hereinafter described and set forth in the claims and illustrated in the accompanying drawings in which Figure 1 is a plan view of a machine embodying the invention, the discharging chutes and the tailings chute being broken away.

Figure 2 is an elevation of the machine, the discharging chutes being omitted.

Figure 3 is a cross-section on line 3—3 of Fig. 1.

Figure 4 is a cross-section on line 4—4 of Fig. 1 and Fig. 5 is a fractional enlarged plan view of the grading mechanism.

Referring to the illustrative embodiment of the invention, 1 represents a table upon which the products to be graded are deposited and from which the products move or are moved onto a series of longitudinal rollers 2, each roller having a rope or band 2a of suitable material spirally wound on its surface, the winding on alternate rollers preferably being reverse to the windings on the remaining rollers. Each roller is rotated by a belt or chain 3 that is driven by a shaft 4 mounted on the main frame 5 and driven through the belt 6 by a shaft 7 mounted on the frame 5.

Two sprockets 8, 9 are mounted on the shaft 7 and are engaged by the chains 10, 11, respectively. The chains train over the idler sprockets 12, 13, mounted on a shaft 14, and train over the sprockets 15 mounted on the driven shaft 16, and also train over the sprockets 17 on the shaft 18. An adjustable roller 19 engages each chain to regulate the tension thereof. A series of spaced abutments 20 is mounted on both chains, each abutment extending laterally across the space between the chains and being fixed or revolubly mounted on the brackets 21 fixed to the chains respectively.

The shaft 16 is driven by the electric motor or other prime mover 22 through the chains of belts and pulleys 23. Any suitable driving connection between the motor and the shaft 16 which will drive the sprockets 15 at the selected speed will suffice for my purposes.

The grading mechanism is mounted in the open top of the frame 5 and consists of a belt B formed of links and connecting rods. A bar 24 is secured to the rear ends of the opposite side walls 25 that project upwardly from the opposite sides of the frame 5. A flexible member 26 such as canvas of suitable weight, is secured to the bar 24 and extends forwardly therefrom, a reinforcing member 27 being secured to the under side of the forward portion of the member 26. Two bearings 28 are mounted on the flexible member 26 and the reinforcing member 27 at the opposite ends thereof and support a shaft or rod 29 carrying the sleeves 30. Links 31 of selected length are pivotally mounted on the rod 29 and spaced by the sleeves 30 and they are similarly mounted on a second rod 32. Similar links 33 of selected length and laterally spaced by sleeves are pivoted on the rod 32 and on the rod 34. Similar links of selected length and lateral spacing are pivoted to each of two adjacent rods throughout the length of the grader, the spacing of the rods and the lateral spacing of the links determining the size of the openings in the belt, which are the smallest in area at the feed end and the largest in area at the discharge end of the belt. The last shaft or rod 35 of the series is mounted similarly to the shaft 29 on a flexible member 36. Hence the grader mechanism floats on the frame 5.

Each grade opening in the belt is controlled by a gate 37 that is freely pivoted on the sleeve at the rear or feed side of the opening and normally depends therefrom under the influence of gravity. The abutment carrier is driven clockwise, Fig. 1, at selected speed and each abutment contacts the transverse rows of gates successively causing the gates to rock upwardly and dislodge any fruit or other object that may be too large to drop through the grade opening but instead lodges in said opening. The undulating belt causes the products including the dislodged products to move forwardly until they drop through the grade openings or pass onto the discharge chute 38.

The chutes 39, 40, 41 and 42 are mounted on the main frame and direct the graded products to separate receptacles. In the drawings, I have shown three transfer rows of openings of the same size at the feed end of the belt. The smaller products therefore have three sets of openings through which they will drop into the chute 42, and thereby remove rapidly from the feed. The next size of products will drop through the next two transverse rows of openings onto the chute 40; the next size will drop through the next two transverse rows of openings onto the chute 41 and the last two rows of transverse openings permit the largest size to drop onto the chute 39. If any of the products are too large to pass through any of the grading openings, they pass onto the tailing chute 38.

Each abutment as it moves along not only raises the control gates successively but it causes the belt to undulate to cause the products being graded to travel forwardly. This undulating feature is shown in Fig. 1.

What I claim is:

1. A grading machine comprising a main frame, a flexible grading belt mounted on the frame and having transverse rows of openings therein varying in size, the openings in each row being adapted to permit the passage of a selected maximum size of product, normally depending gates each having a planar upper surface pivotally mounted adjacent to the openings respectively, an endless carrier mounted below the belt and supporting a plurality of abutments, each of which is adapted to engage the belt and the transverse rows of gates successively and rock them into the belt openings adjacent thereto, said gates being adapted to substantially fill said openings, said travelling abutments also causing the belt to undulate longitudinally, means to drive the carrier, means to feed the products to be graded to the belt and means to conduct the graded products from the machine, said carrier and abutments being disposed to move past said belt parallel to the direction of feed of the products whereby the undulation of said belt will advance said products along the belt in the direction of feed.

2. A grading machine comprising a main frame, a belt mounted at its ends on the frame and having a relatively large amount of slack, said belt consisting of a series of spaced parallel transverse rods, the opposite end rods having a flexible connection to the frame, a plurality of links pivotally connecting adjacent rods, the links of any transverse row being uniform in selected length and laterally spaced to form with the associated rods a row of discharge openings of selected size in the belt, a gate having a planar upper surface normally pivotally depending from one of the rods at each discharge opening, an endless abutment carrier having a plurality of abutments mounted thereon supported below the belt, each abutment being adapted to engage the transverse rows of gates successively and rock them upwardly and also cause the belt to undulate longitudinally, said abutments being so spaced as to leave open at least two adjacent rows of discharge openings, means to drive the carrier at selected speed parallel to said belt and in the direction of flow of the product whereby the undulations of said belt will be in the direction of and will cause the flow of the product and means to conduct the graded products from the machine.

3. A grading machine for food products comprising a main frame, a flexible belt supported on the main frame and having a plurality of transverse rows of openings therein for the discharge of the product according to size, the openings in any row being uniform in size, and the openings in selected rows being larger than those in the adjacent row relatively to the feed end of the belt, solid gates depending adjacent to the openings respectively, driven means to engage and raise the transverse gates successively and to cause the belt to undulate longitudinally, means for driving said driven means relative to said belt away from the feed end of the belt whereby the undulations of the belt will be in a direction to move the product along the belt and away from the feed end thereof, a series of helically ribbed, parallel rollers mounted adjacent to the feed end of the belt, having their longitudinal axes directed toward the belt to convey the product toward the belt, means to rotate the rollers simultaneously and means to convey the graded products from the machine.

4. In an article grading machine, the combination of a frame, a grading table made of rigid links pivotally supported on transverse rods to form a plurality of groups of transverse rows of grading openings, means for supporting said table in a slack condition on said frame, means for causing undulations of said table progressing in one longitudinal direction thereof, the openings of each group in the direction of said undulations being larger than the openings of the preceding group, and means mounted adjacent each opening and disposed for actuation by said undulation causing means for completely ejecting an article upwardly from an opening in advance of the peak of an undulation whereby said article will be freed from one opening and passed to the adjacent row of openings.

5. In an article grading machine, the combination of a frame, a grading table comprising a plurality of rigid links pivotally mounted on transverse rods to form transverse rows of grading openings, article ejecting gates, one for each opening, pivotally mounted on said rods, and feeding abutments mounted to move relative to, longitudinally of, and in contact with the lower surface of said table and to lift said table along a transverse line, so as to cause longitudinally progressing undulations therein, said gates being formed so as to be contacted by said abutments and forced up into said openings, to form a downwardly sloping surface on which the articles will move toward the adjacent row of openings.

GUSTAVE H. BLEEKE.